(12) United States Patent
Stewart, Jr.

(10) Patent No.: US 12,309,445 B2
(45) Date of Patent: May 20, 2025

(54) DOUBLE SIDED MONITOR DEVICE

(71) Applicant: Edwin Stewart, Jr., Flint, MI (US)

(72) Inventor: Edwin Stewart, Jr., Flint, MI (US)

( * ) Notice: Subject to any disclaimer, the term of this patent is extended or adjusted under 35 U.S.C. 154(b) by 13 days.

(21) Appl. No.: 18/231,328

(22) Filed: Aug. 8, 2023

(65) Prior Publication Data

US 2025/0056082 A1    Feb. 13, 2025

(51) Int. Cl.
*H04N 21/414*    (2011.01)
*H04N 21/422*    (2011.01)

(52) U.S. Cl.
CPC ..... *H04N 21/414* (2013.01); *H04N 21/42206* (2013.01)

(58) Field of Classification Search
CPC .......... H04N 21/414; H04N 21/42206
See application file for complete search history.

(56) References Cited

U.S. PATENT DOCUMENTS

| | | | | |
|---|---|---|---|---|
| 5,982,951 A * | 11/1999 | Katayama | ............ | H04N 1/4072 382/284 |
| 6,065,042 A * | 5/2000 | Reimer | ............ | G06F 16/78 348/E7.071 |
| D458,255 S | 6/2002 | Hsu | | |
| 6,658,662 B1 * | 12/2003 | Nielsen | ............ | H04N 7/16 348/E7.054 |
| 7,035,468 B2 * | 4/2006 | Yogeshwar | ............ | G06F 16/71 707/E17.031 |
| 7,092,888 B1 * | 8/2006 | McCarthy | ............ | G10L 15/1822 704/277 |
| 7,110,664 B2 * | 9/2006 | Yogeshwar | ............ | H04N 5/76 386/328 |
| 7,664,678 B1 * | 2/2010 | Haber | ............ | G06Q 30/0639 705/26.9 |
| 7,774,815 B1 * | 8/2010 | Allen | ............ | H04N 21/8133 725/51 |
| 7,801,910 B2 * | 9/2010 | Houh | ............ | G06F 16/583 707/765 |
| 7,814,524 B2 * | 10/2010 | Candelore | ............ | H04N 21/47 725/39 |
| 7,908,628 B2 * | 3/2011 | Swart | ............ | H04N 21/6377 725/135 |
| 8,079,054 B1 * | 12/2011 | Dhawan | ............ | H04N 21/812 705/14.6 |

(Continued)

FOREIGN PATENT DOCUMENTS

WO    WO2021103088    6/2021

*Primary Examiner* — Michael B. Pierorazio

(57) ABSTRACT

A double sided monitor device includes a monitor that has a first display and a second display each positioned on opposing sides of the monitor to be visible to a respective one of a pair of users. A pair of signal units is each integrated into the monitor and each of the pair of signal units is in electrical communication with a respective one of the first display and the second display. Each of the signal units has a plurality of input elements to receive a signal from a variety of signal sources. A pair of remote controls is each in remote communication with a respective one of the signal units for remotely controlling operational parameters of the respective signal unit. In this way the pair of users can independently select the video to be displayed on a respective one of the first display and the second display.

6 Claims, 10 Drawing Sheets

(56) References Cited

U.S. PATENT DOCUMENTS

| | | | | |
|---|---|---|---|---|
| 8,209,724 B2* | 6/2012 | Rathod | H04N 21/435 | 348/715 |
| 8,296,808 B2* | 10/2012 | Hardacker | H04N 21/482 | 725/51 |
| 8,423,363 B2* | 4/2013 | Gupta | G10L 15/22 | 704/251 |
| 8,572,488 B2* | 10/2013 | Phillips | G06F 3/0482 | 715/716 |
| 9,367,280 B2 | 6/2016 | Avrahami | | |
| 9,462,340 B1* | 10/2016 | Mathurin | H04N 21/8106 | |
| 9,652,773 B1* | 5/2017 | Dublin, III | G02F 1/1336 | |
| 9,946,506 B2 | 4/2018 | Ting | | |
| 11,380,748 B2* | 7/2022 | Hou | H10K 50/865 | |
| 2002/0133562 A1* | 9/2002 | Newnam | G06Q 30/02 | 709/216 |
| 2002/0162117 A1* | 10/2002 | Pearson | H04N 21/4758 | 725/135 |
| 2002/0170068 A1* | 11/2002 | Rafey | H04N 21/4782 | 348/E7.071 |
| 2003/0025832 A1* | 2/2003 | Swart | H04N 21/4828 | 348/E7.071 |
| 2003/0034951 A1* | 2/2003 | Fry | G06F 1/1616 | 345/156 |
| 2003/0206717 A1* | 11/2003 | Yogeshwar | G11B 27/10 | 386/328 |
| 2004/0073493 A1* | 4/2004 | Kato | H04N 7/17318 | 348/E7.071 |
| 2004/0096110 A1* | 5/2004 | Yogeshwar | G06F 16/51 | 707/E17.031 |
| 2005/0066352 A1* | 3/2005 | Herley | H04N 21/42203 | 348/E7.071 |
| 2005/0188411 A1* | 8/2005 | Dacosta | G06F 16/4387 | 348/E7.071 |
| 2005/0289595 A1* | 12/2005 | Nakamura | H04N 21/47214 | 725/52 |
| 2006/0015339 A1* | 1/2006 | Charlesworth | G10L 15/187 | 704/E15.02 |
| 2006/0070101 A1* | 3/2006 | Hirahara | H04N 21/4312 | 725/59 |
| 2007/0061862 A1* | 3/2007 | Berger | H04N 7/163 | 725/62 |
| 2007/0112837 A1* | 5/2007 | Houh | G06F 16/489 | 707/E17.02 |
| 2007/0124756 A1* | 5/2007 | Covell | G06F 16/635 | 348/E7.071 |
| 2007/0124788 A1* | 5/2007 | Wittkoter | H04N 7/165 | 348/E7.071 |
| 2008/0091713 A1* | 4/2008 | Candelore | H04N 7/163 | |
| 2008/0097984 A1* | 4/2008 | Candelore | H04N 21/4332 | 707/999.005 |
| 2008/0204595 A1* | 8/2008 | Rathod | H04N 21/44008 | 348/E7.001 |
| 2008/0262996 A1* | 10/2008 | Yogeshwar | G06F 16/71 | 707/E17.031 |
| 2008/0266449 A1* | 10/2008 | Rathod | H04N 21/8133 | 348/E7.001 |
| 2008/0285940 A1* | 11/2008 | Kulas | H04N 21/4858 | 386/353 |
| 2009/0094632 A1* | 4/2009 | Newnam | H04N 21/43074 | 725/24 |
| 2009/0112592 A1* | 4/2009 | Candelore | H04N 21/42203 | 704/E15.001 |
| 2009/0293081 A1* | 11/2009 | Pirani | H04N 21/4334 | 707/999.003 |
| 2009/0299752 A1* | 12/2009 | Rodriguez | G06F 40/242 | 704/E15.001 |
| 2010/0146563 A1* | 6/2010 | Chang | H04N 21/42607 | 455/3.06 |
| 2010/0316131 A1* | 12/2010 | Shanableh | H04N 19/61 | 375/E7.011 |
| 2011/0038109 A1* | 2/2011 | Hwang | G06F 1/1601 | 361/679.01 |
| 2011/0069940 A1* | 3/2011 | Shimy | H04N 21/4532 | 386/296 |
| 2011/0145883 A1* | 6/2011 | Godar | H04N 5/445 | 725/131 |
| 2011/0283189 A1* | 11/2011 | McCarty | H04N 21/4532 | 715/810 |
| 2011/0289530 A1* | 11/2011 | Dureau | G06F 16/48 | 725/38 |
| 2012/0016678 A1* | 1/2012 | Gruber | G06N 5/041 | 704/E21.001 |
| 2012/0050811 A1* | 3/2012 | Koike | G09G 5/363 | 358/1.16 |
| 2012/0210349 A1* | 8/2012 | Campana | G06F 3/1438 | 725/78 |
| 2012/0243165 A1 | 9/2012 | Chang | | |
| 2014/0181865 A1* | 6/2014 | Koganei | H04N 21/4312 | 725/38 |
| 2014/0278834 A1* | 9/2014 | Lautz | G06Q 30/0245 | 705/12 |
| 2014/0350925 A1* | 11/2014 | Park | G10L 15/22 | 704/231 |
| 2014/0373082 A1* | 12/2014 | Miyazaki | H04N 21/4415 | 725/110 |
| 2015/0082349 A1* | 3/2015 | Ishtiaq | H04N 21/4316 | 725/40 |
| 2015/0229975 A1* | 8/2015 | Shaw | H04N 21/6587 | 725/10 |
| 2016/0255962 A1* | 9/2016 | Tang | A47C 13/00 | |
| 2021/0274239 A1* | 9/2021 | Grigore | H04L 12/1859 | |
| 2022/0093034 A1* | 3/2022 | Noh | H04N 5/21 | |

\* cited by examiner

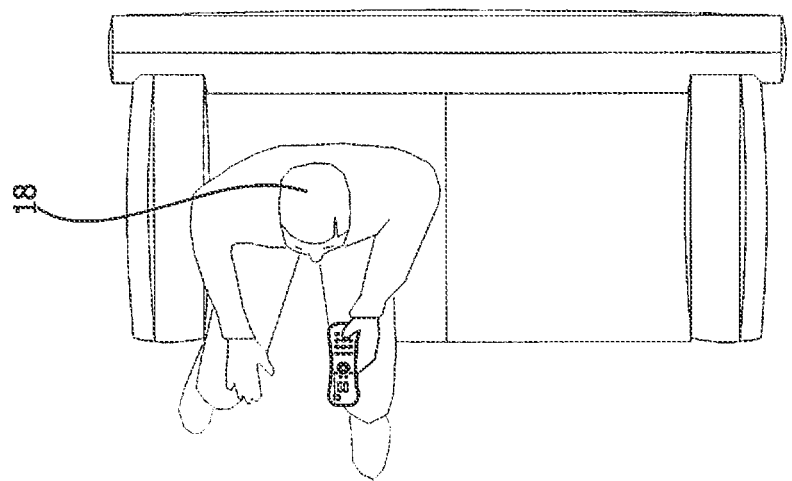
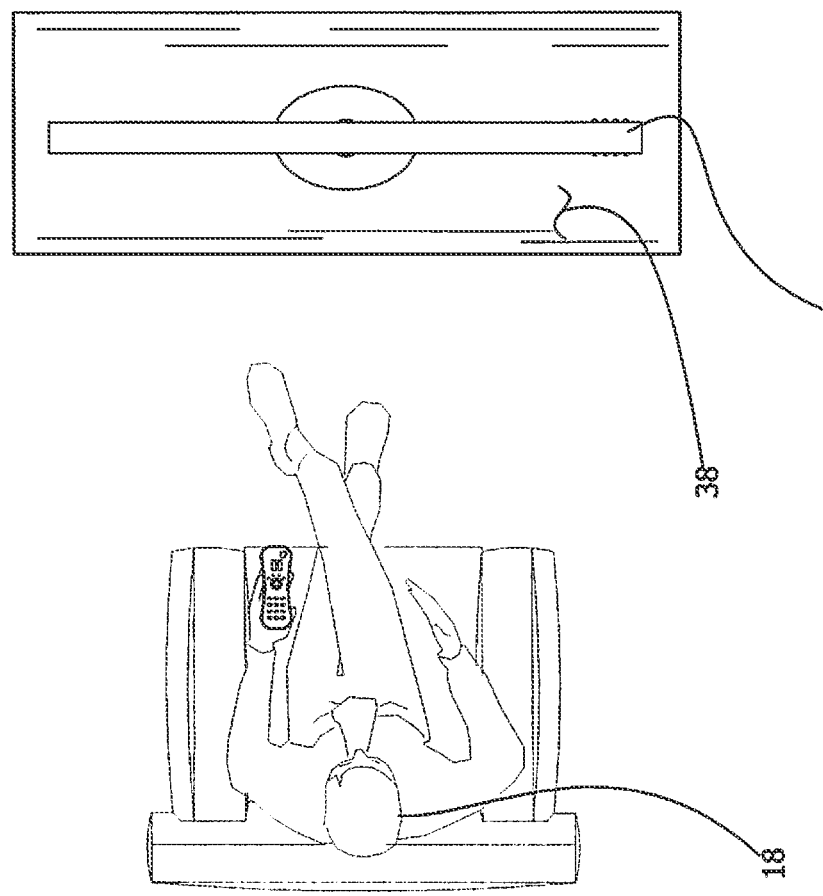
FIG. 10

DOUBLE SIDED MONITOR DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to monitor devices and more particularly pertains to a new monitor device for facilitating a pair of users to simultaneously watch video footage from different signal sources. The device includes a monitor which has a pair of displays integrated into opposite sides of the monitor with respect to each other. The device includes a pair of signal units integrated into the monitor which are each in communication with a respective one of the displays. Each of the signal units can receive a signal from a variety of signal sources and the device includes a pair of remote controls for remotely controlling each of the signal units.

(2) Description of Related Art Including Information Disclosed Under 37 CFR 1.97 and 1.98

The prior art relates to monitor devices including a variety of dual screen electronic devices that facilitates video to be displayed on each of the dual screens and a variety of multiple screen electronic devices that have a pair of screens that are structurally independent from each other for viewing different video footage on each of the pair of screens. In no instance does the prior art disclose a dual screen monitor that has pair of displays and a pair of signal units for receiving signal from a variety of signal sources and a pair of remote controls for remotely controlling each of the pair of signal units.

BRIEF SUMMARY OF THE INVENTION

An embodiment of the disclosure meets the needs presented above by generally comprising a monitor that has a first display and a second display each positioned on opposing sides of the monitor to be visible to a respective one of a pair of users. A pair of signal units is each integrated into the monitor and each of the pair of signal units is in electrical communication with a respective one of the first display and the second display. Each of the signal units has a plurality of input elements to receive a signal from a variety of signal sources. A pair of remote controls is each in remote communication with a respective one of the signal units for remotely controlling operational parameters of the respective signal unit. In this way the pair of users can independently select the video to be displayed on a respective one of the first display and the second display.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 10 is a perspective in-use view of an embodiment of the disclosure.

DETAILED DESCRIPTION OF THE INVENTION

Figure 1:
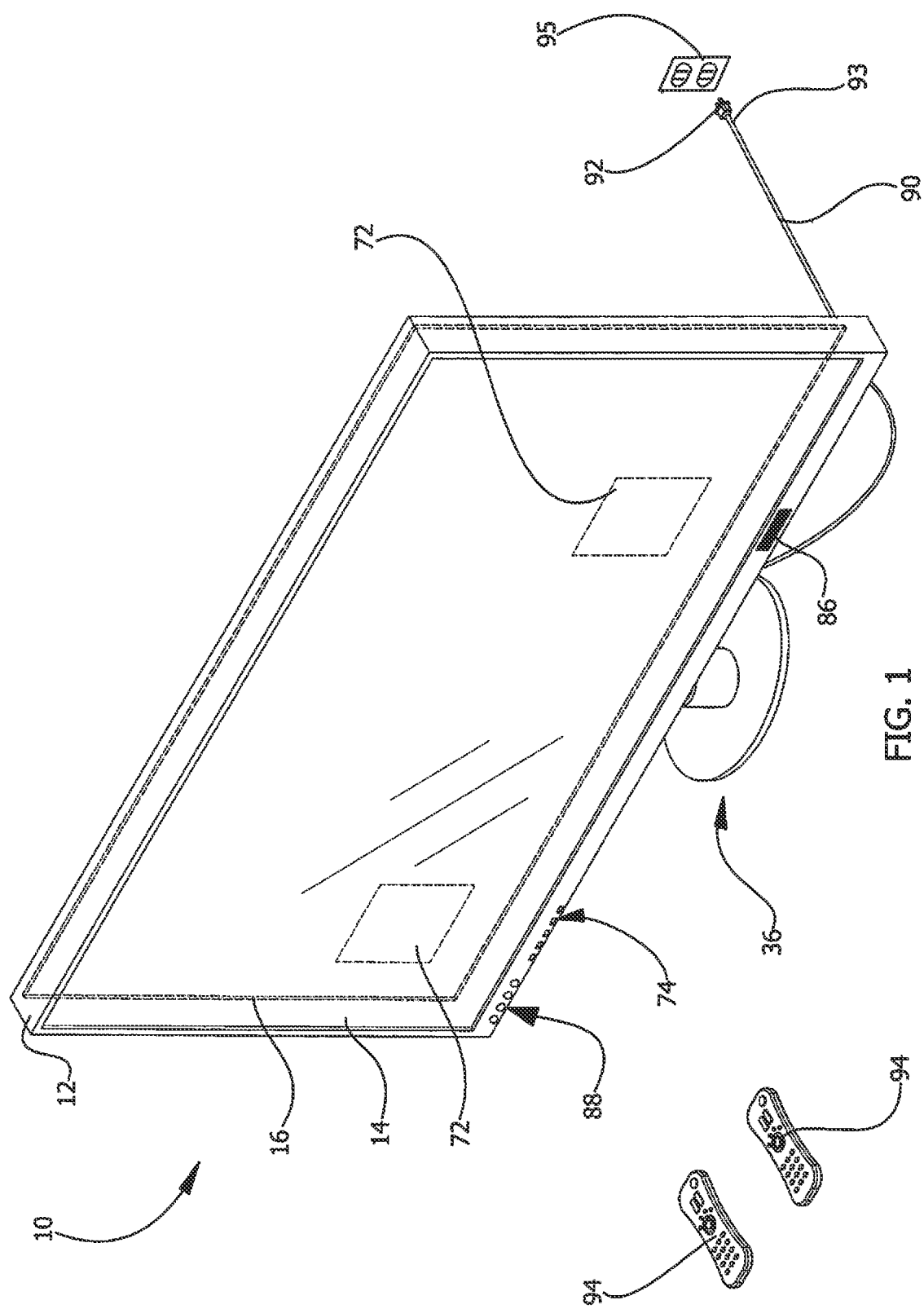
FIG. 1 is a front perspective view of a double sided monitor device according to an embodiment of the disclosure.
Figure 2:
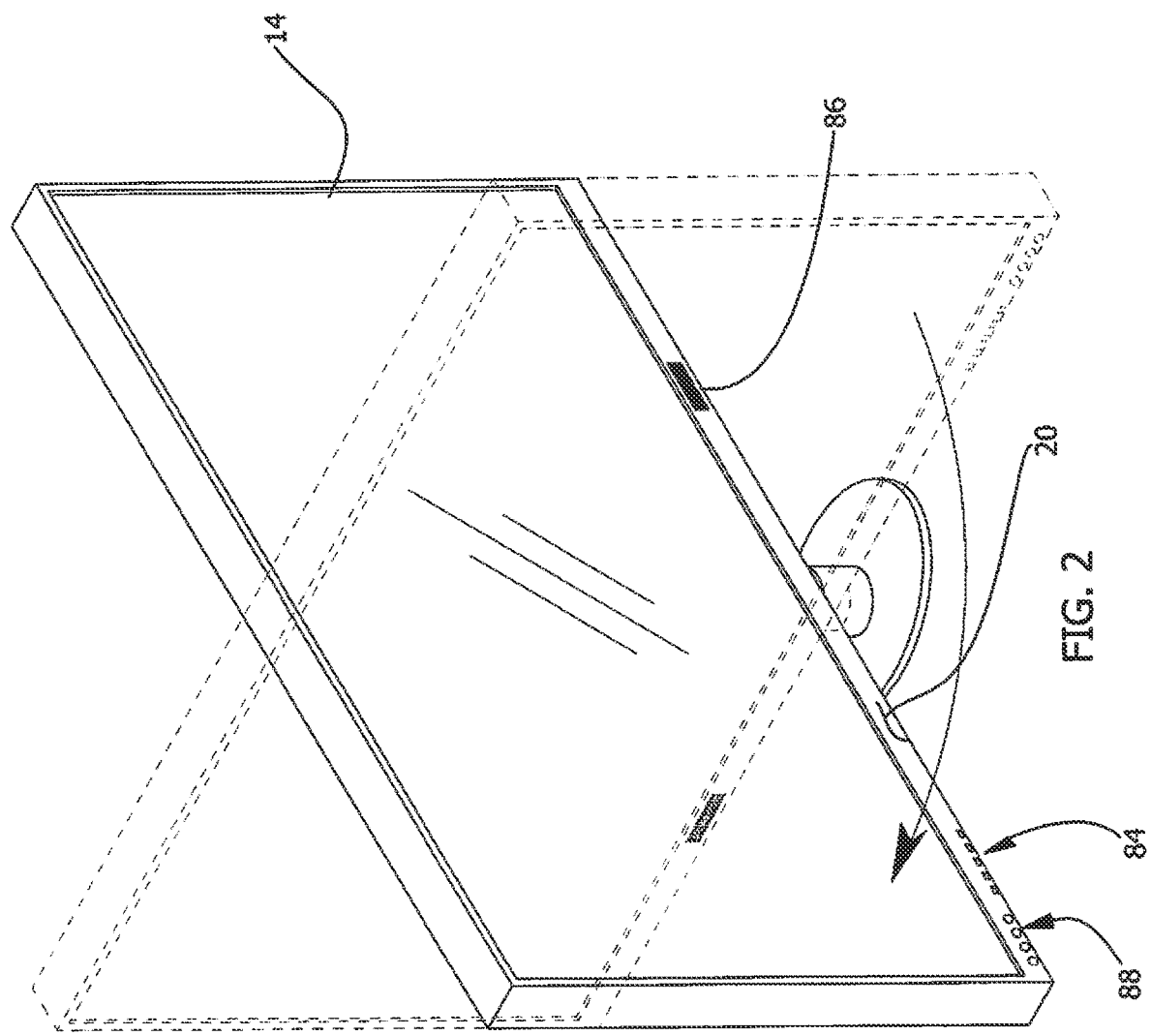
FIG. 2 is a perspective view of an embodiment of the disclosure.
Figure 3:
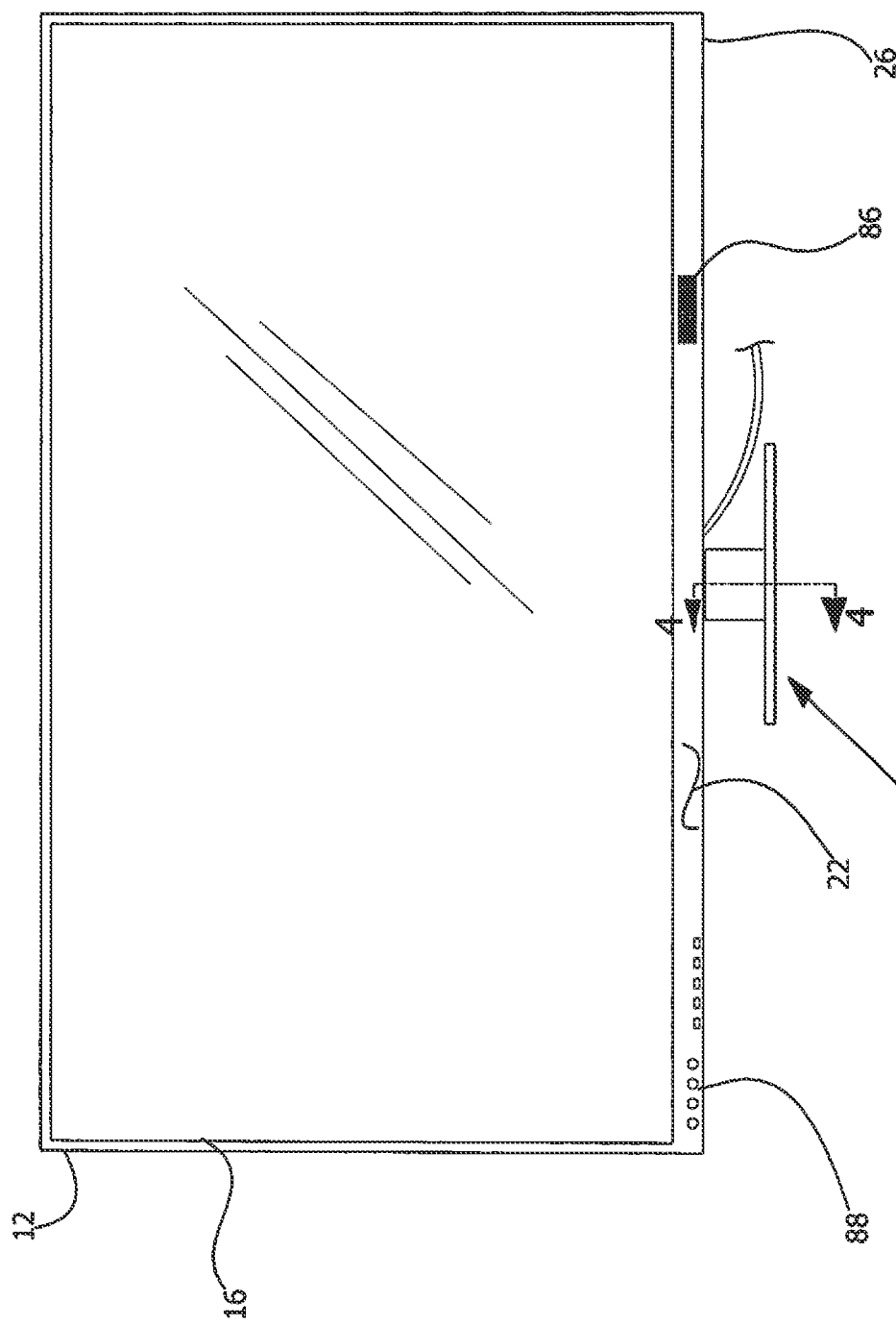
FIG. 3 is a back view of an embodiment of the disclosure.
Figure 4:
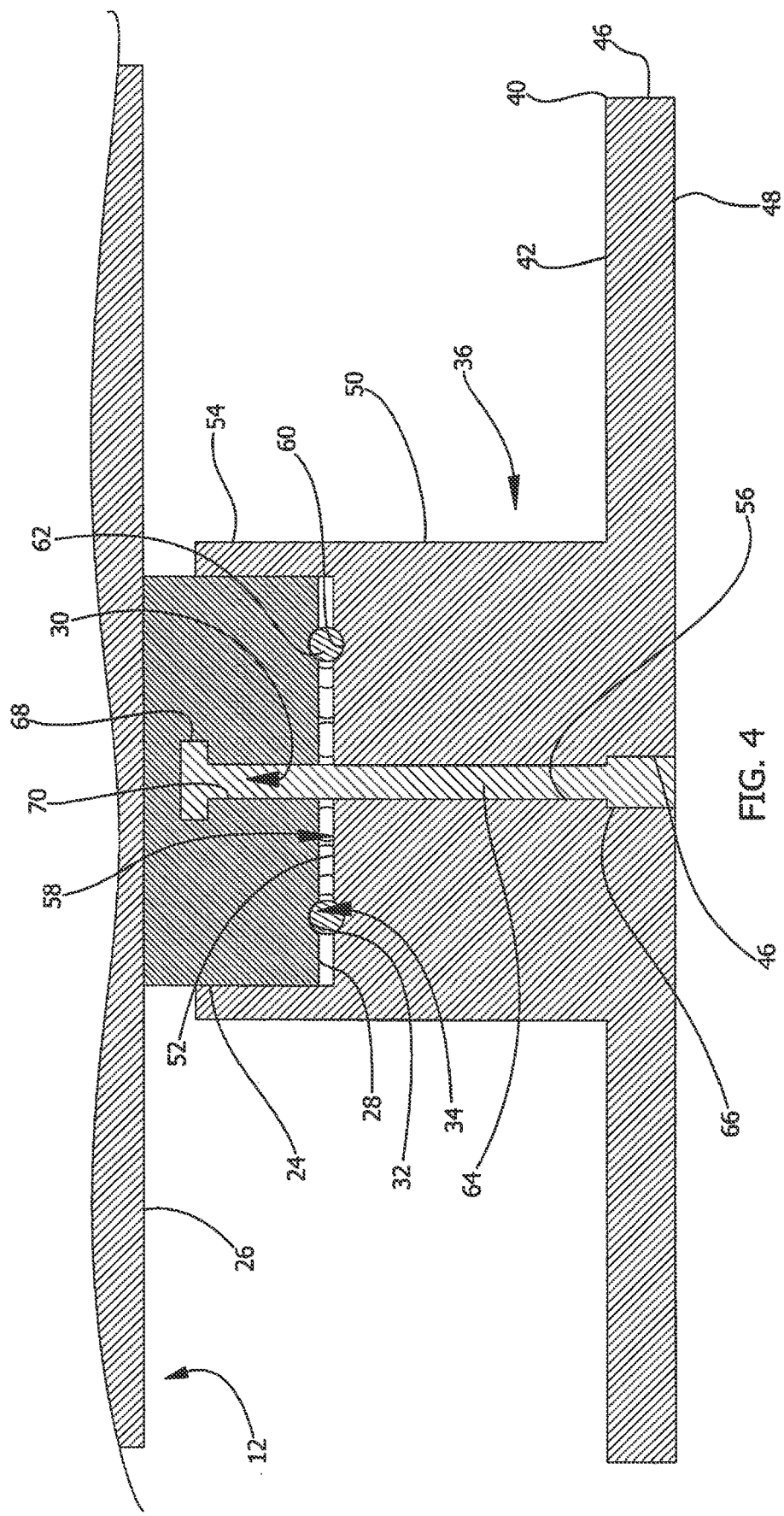
FIG. 4 is a cross sectional view taken along line 4-4 of FIG. 3 of an embodiment of the disclosure.
Figure 5:
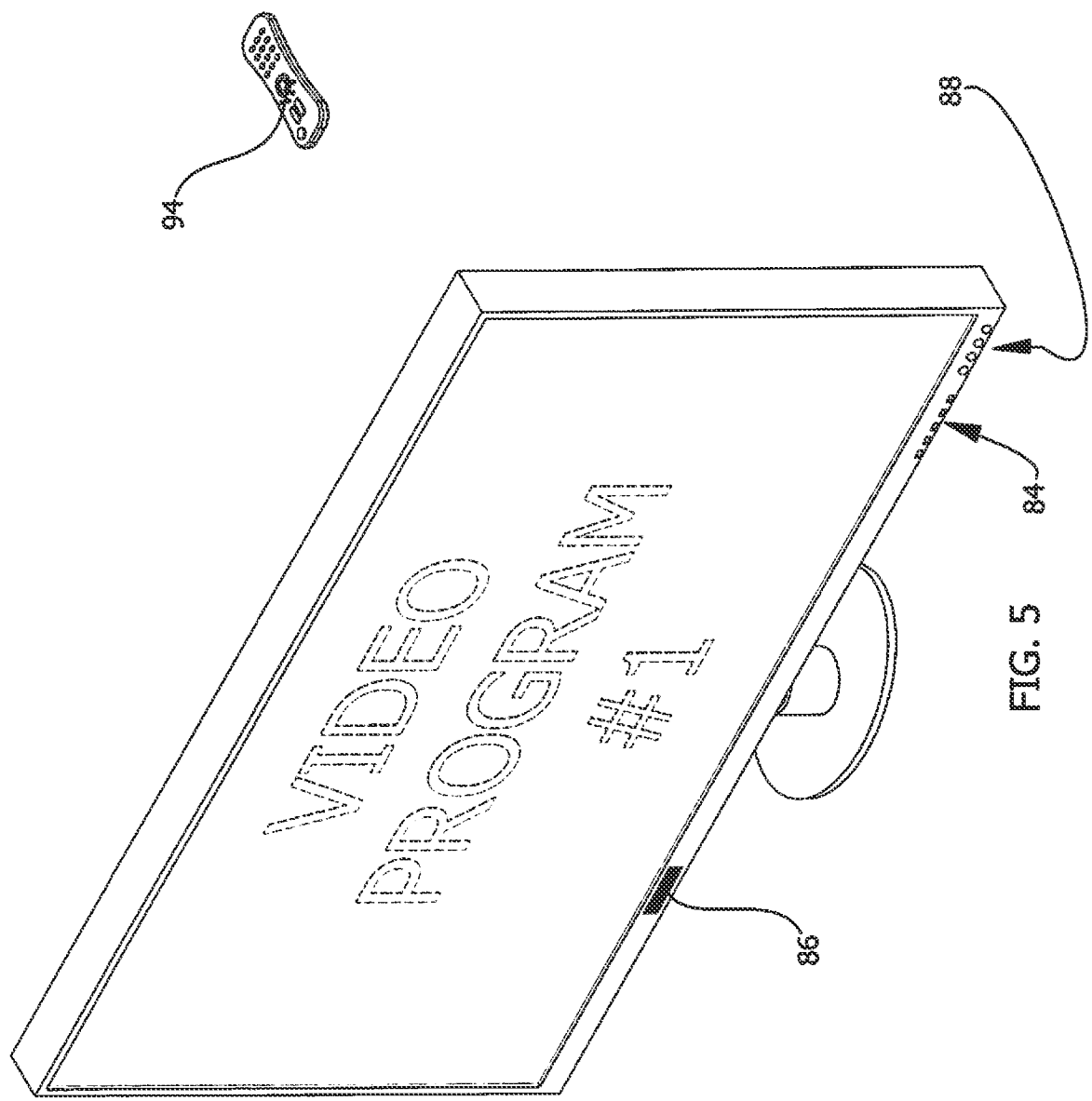
FIG. 5 is a front perspective in-use view of an embodiment of the disclosure.
Figure 6:
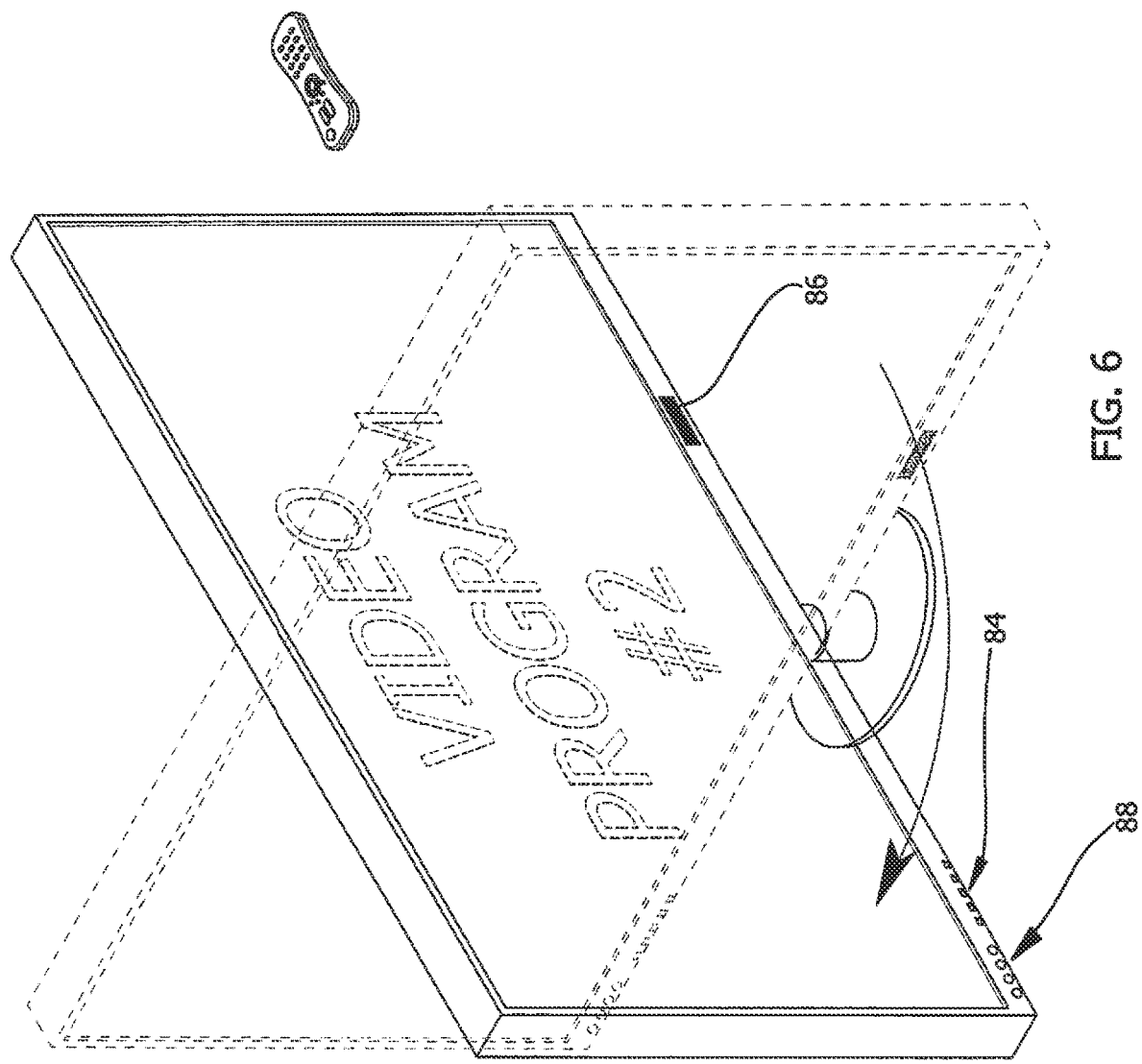
FIG. 6 is a top perspective in-use view of an embodiment of the disclosure.
Figure 7:
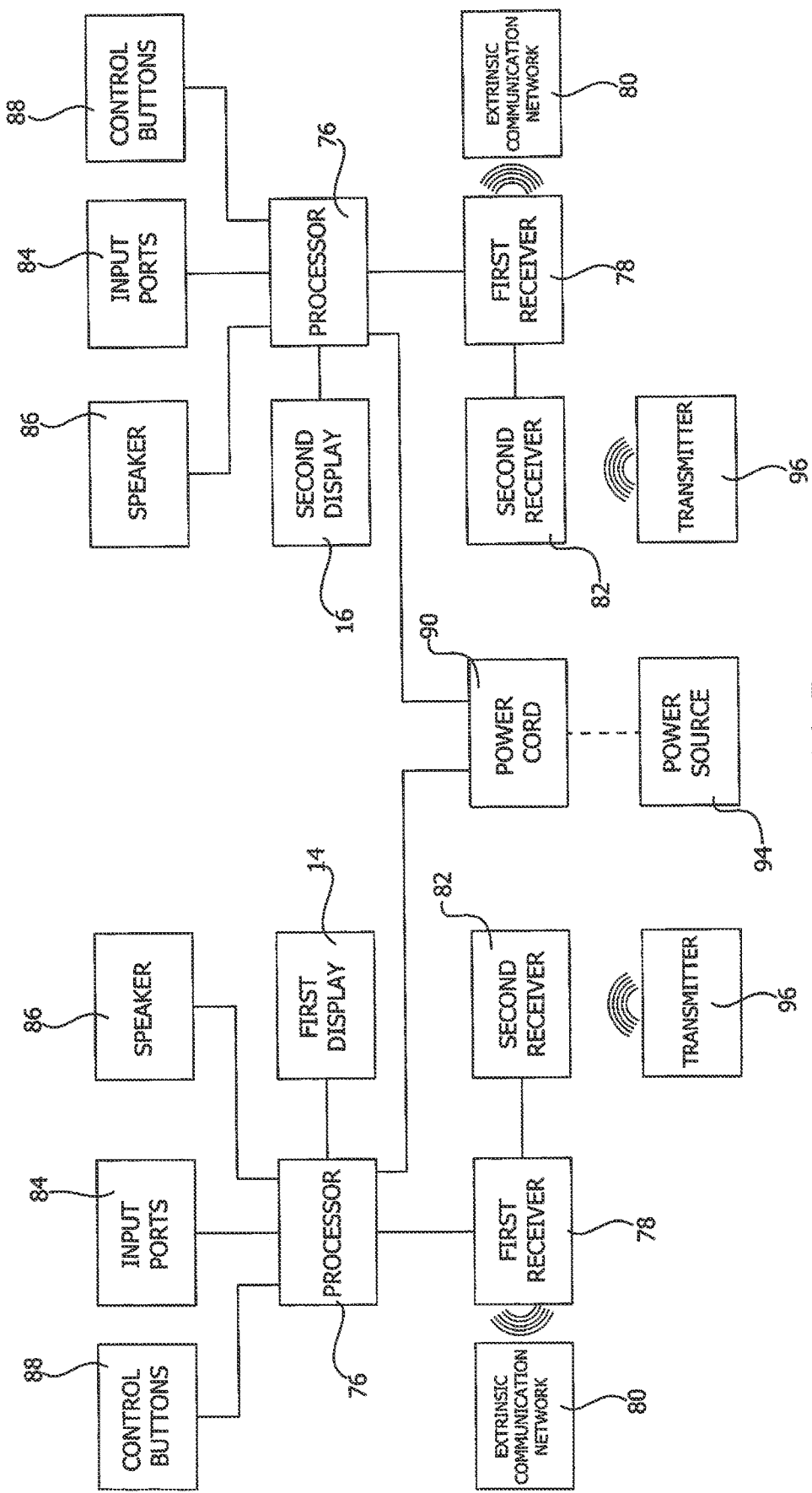
FIG. 7 is a schematic view of an embodiment of the disclosure.
Figure 8:
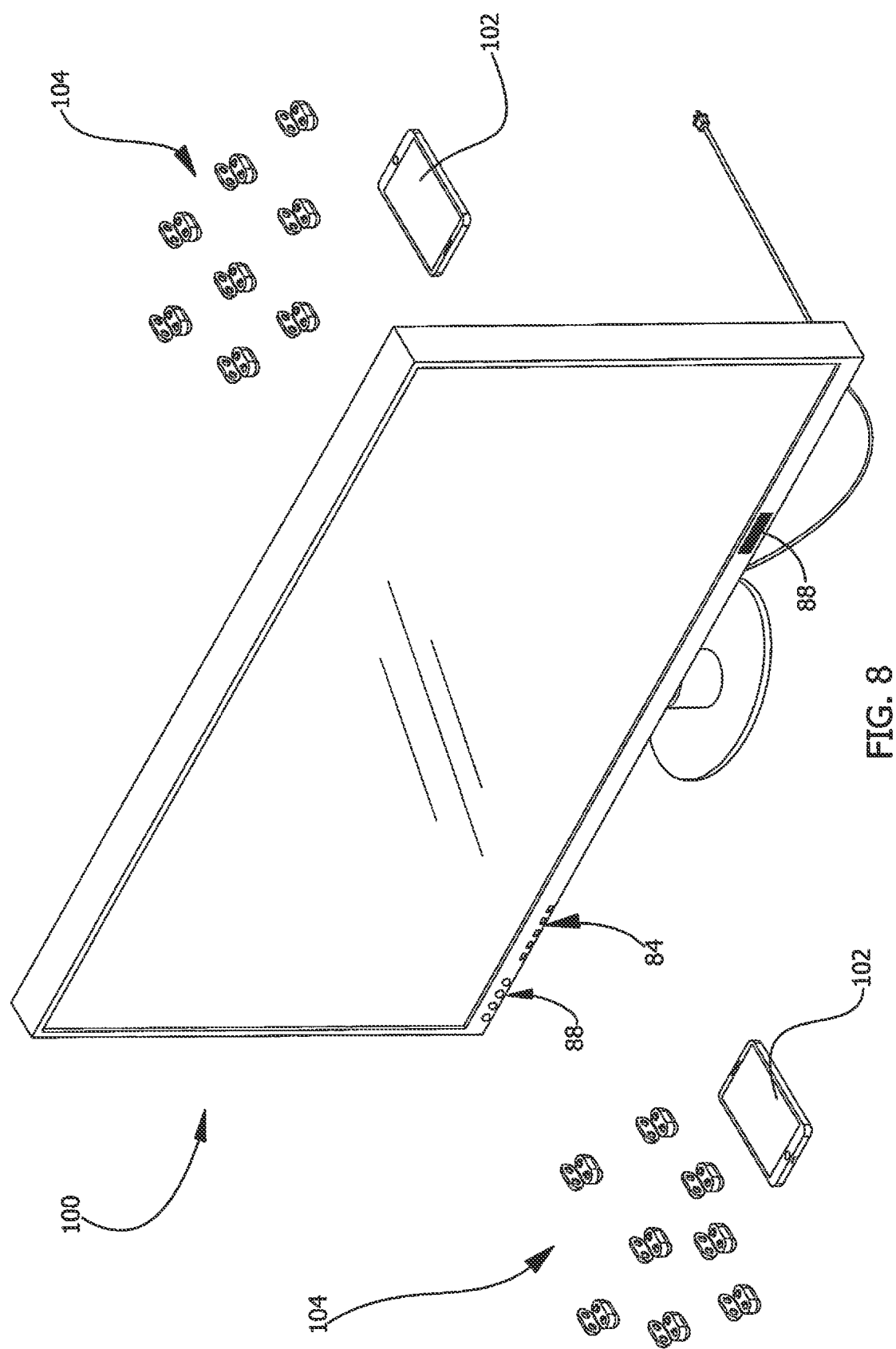
FIG. 8 is a perspective view of an alternative embodiment of the disclosure.

With reference now to the drawings, and in particular to FIGS. 1 through 10 thereof, a new monitor device embodying the principles and concepts of an embodiment of the disclosure and generally designated by the reference numeral 10 will be described.

As best illustrated in FIGS. 1 through 10, the double sided monitor device 10 generally comprises a monitor 12 that has a first display 14 and a second display 16 and the first display 14 and the second display 16 are positioned on opposing sides of the monitor 12. In this way each of the first display 14 and the second display 16 are visible to a respective one of a pair of users 18. The first display 14 is integrated into a front surface 20 of the monitor 12 such that the first display 14 covers a substantial area of the front surface 20. Furthermore, the second display 16 is integrated into a back surface 22 of the monitor 12 such that the second display 16 covers a substantial area of the back surface 22. As is shown in FIG. 10, the monitor 12 and each of the first display 14 and the second display 16 may be manufactured in a variety of standard monitor sizes which might range between approximately 48.0 cm and 86.0 cm measured diagonally. Additionally, each of the first display 14 and the second display 16 may comprise a light emitting diode display or other type of electronic display that might commonly be found in computer monitors and flat screen televisions.

The monitor 12 has a stem 24 extending downwardly from a bottom side 26 of the monitor 12 and the stem 24 is centrally located along the bottom side 26. The stem 24 has a distal end 28 with respect to the bottom side 26 and the stem 24 has a shaft well 30 extending into the distal end 28. Additionally, the shaft well 30 is centrally located on the distal end 28. The stem 24 has a depression 32 extending into the distal end 28 and the depression 32 is continuous such that the depression 32 forms a closed ring surrounding the shaft well 30. Additionally, the depression 32 has a bounding surface 34 that is concavely arcuate with respect to the distal end 28.

The monitor 12 is rotatably attached to a pedestal 36 for rotating the monitor 12 into a preferred orientation to support the monitor 12 over a support surface 38. The pedestal 36 comprises a disk 40 that has a top surface 42 and a perimeter edge 44 and the disk 40 is elongated such that the disk 40 has an ovoid shape. The disk 40 has a hole 46 extending through the top surface 42 and a bottom surface 48 of the disk 40 and the hole 46 is centrally located on the disk 40. The pedestal 36 includes a cup 50 extending upwardly from the top surface 42 of the disk 40 and the cup 50 is centrally positioned on the disk 40. The cup 50 has a bottom wall 52 and a perimeter wall 54 extending upwardly from the bottom wall 52 and the cup 50 has a shaft aperture 56 extending through the bottom wall 52. Additionally, the shaft aperture 56 is aligned with and intersects the hole 46 in the disk 40.

The cup 50 receives the stem 24 on the bottom side 26 of the monitor 12 such that the shaft aperture 56 is aligned with the shaft well 30 in the distal end 28 of the stem 24. A top surface 58 of the bottom wall 52 of the cup 50 has a depression 60 extending downwardly into the top surface 58. The depression 60 associated with the cup 50 is continuous such that the depression 60 associated with the cup 50 forms a closed loop. Furthermore, the depression 60 associated with the cup 50 is aligned with the depression 32 in the distal end 28 of the stem 24.

The pedestal 36 includes a ball bearing 62 that is positioned in the depression 60 associated with the cup 50 and the depression 32 in the distal end 28 of the stem 24 thereby facilitating the stem 24 to freely rotate in the cup 50. The pedestal 36 includes a shaft 64 which extends through the hole 46 in the disk 40 and the shaft aperture 56 in the cup 50. The shaft 64 extends+ into the shaft well 30 in the distal end 28 of the stem 24. The shaft 64 has a lower head 66 which is positioned in the hole 46 in the disk 40 and the hole 46 has a diameter that is less than a diameter of the shaft aperture 56 thereby inhibiting the lower head 66 from passing into the shaft aperture 56. Additionally, the shaft 64 has an upper head 68 which engages a bounding surface 70 of the shaft well 30 for retaining the stem 24 in the cup 50.

A pair of signal units 72 is provided and each of the pair of signal units 72 is integrated into the monitor 12. Each of the pair of signal units 72 is in electrical communication with a respective one of the first display 14 and the second display 16. Additionally, each of the signal units 72 has a plurality of input elements 74 such that each of the signal units 72 can receive a signal from a variety of signal sources. In this way each of the first display 14 and the second display 16 can display video from a respective signal source.

Each of the signal units 72 comprises a processor 76 that is integrated into the monitor 12. Additionally, the processor 76 associated with each of the pair of signal units 72 is electrically coupled to a respective one of the first display 14 and the second display 16. A first receiver 78 is integrated into the monitor 12 such that the first receiver 78 defines a respective one of the plurality of input elements 74 and the first receiver 78 is electrically coupled to the processor 76. The first receiver 78 is in wireless communication with an extrinsic communication network 80 to receive a broadcast signal from the extrinsic communication network 80. In this way the respective first display 14 or the second display 16 can display video associated with the broadcast signal. The extrinsic communication network 80 may be the internet, a broadcast television system, a cellular phone network or any other type of wireless global communication network. The first receiver 78 associated with each of the signal units 72 may comprise a radio frequency receiver or the like and the first receiver 78 associated with each of the signal units 72 may employ a WPAN signal or other type of proprietary signal to communicate with a wireless global communication network.

Each of the signal units 72 includes a second receiver 82 that is integrated into the monitor 12 and the second receiver 82 is electrically coupled to the processor 76. The second receiver 82 associated with each of the signal units 72 may comprise an infra-red light receiver or other type of receiver commonly employed with remote controls that do not employ a radio frequency signal. A plurality of input ports 84 is each integrated into the monitor 12 such that each of the plurality of input ports 84 defines a respective one of the input elements 74. Each of the plurality of input ports 84 is electrically coupled to the processor 76 and each of the plurality of input ports 84 has a unique structure with each other. In this way each of the plurality of input ports 84 can insertably receive a respective type of input cord for receiving a signal from the input cord thereby facilitating the respective first display 14 or second display 16 to display video associated with the signal. The plurality of input ports 84 may include, but not be limited to, universal serial bus ports, high definition multimedia interfaces, rca (Radio Corporation of America) inputs and any other data port which can receive both video signals and audio signals.

Each of the signal units 72 includes a speaker 86 that is integrated into the monitor 12 and the speaker 86 is electrically coupled to the processor 76. In this way the speaker 86 associated with each of the signal units 72 can emit audio associated with the signal received from the input ports 84 or the broadcast signal received from the first receiver 78. The speaker 86 associated with each of the pair of signal units 72 is integrated into a respective one of the front surface 20 of the monitor 12 and the back surface 22 of the monitor 12. Furthermore, the speaker 86 associated with each of the signal units 72 may comprise an electromagnetic speaker of any conventional design that is commonly employed in audio equipment.

Each of the signal units 72 includes a plurality of control buttons 88 and each of the plurality of control buttons 88 is movably integrated into the monitor 12. Each of the plurality of control buttons 88 is electrically coupled to the processor 76 for selecting operational parameters of the first receiver 78, the processor 76 and the speaker 86 associated with a respective signal unit 72. The operational parameters of the first receiver 78 may include synchronization with Bluetooth devices or wireless internet routers and the operational parameters of the speaker 86 may include volume up and volume down and the operational parameters of the processor 76 may be power on and power off.

A power cord 90 is coupled to and extends away from the monitor 12 and the power cord 90 is electrically coupled to the processor 76. The power cord 90 has a male plug 92 that is electrically coupled to a distal end 93 of the power cord 90 thereby facilitating the male plug 92 to be plugged into a power source 94 comprising a female electrical outlet. A pair of remote controls 95 is provided and each of the pair of remote controls 95 is in remote communication with a respective one of the signal units 72 for remotely controlling operational parameters of the respective signal unit 72. In this way the pair of remote controls 95 facilitates the pair of users 18 to independently select the video to be displayed on a respective one of the first display 14 and the second display 16. Each of the pair of remote controls 95 includes a transmitter 96 that is in wireless communication with the second receiver 82 associated with the respective signal unit 72. The transmitter 96 associated with each of the remote controls 95 may comprise a radio frequency transmitter or the like and each of the remote controls 95 includes a variety of control buttons 98 for remotely controlling all of the operational parameters of a respective signal unit 72.

Figure 9:
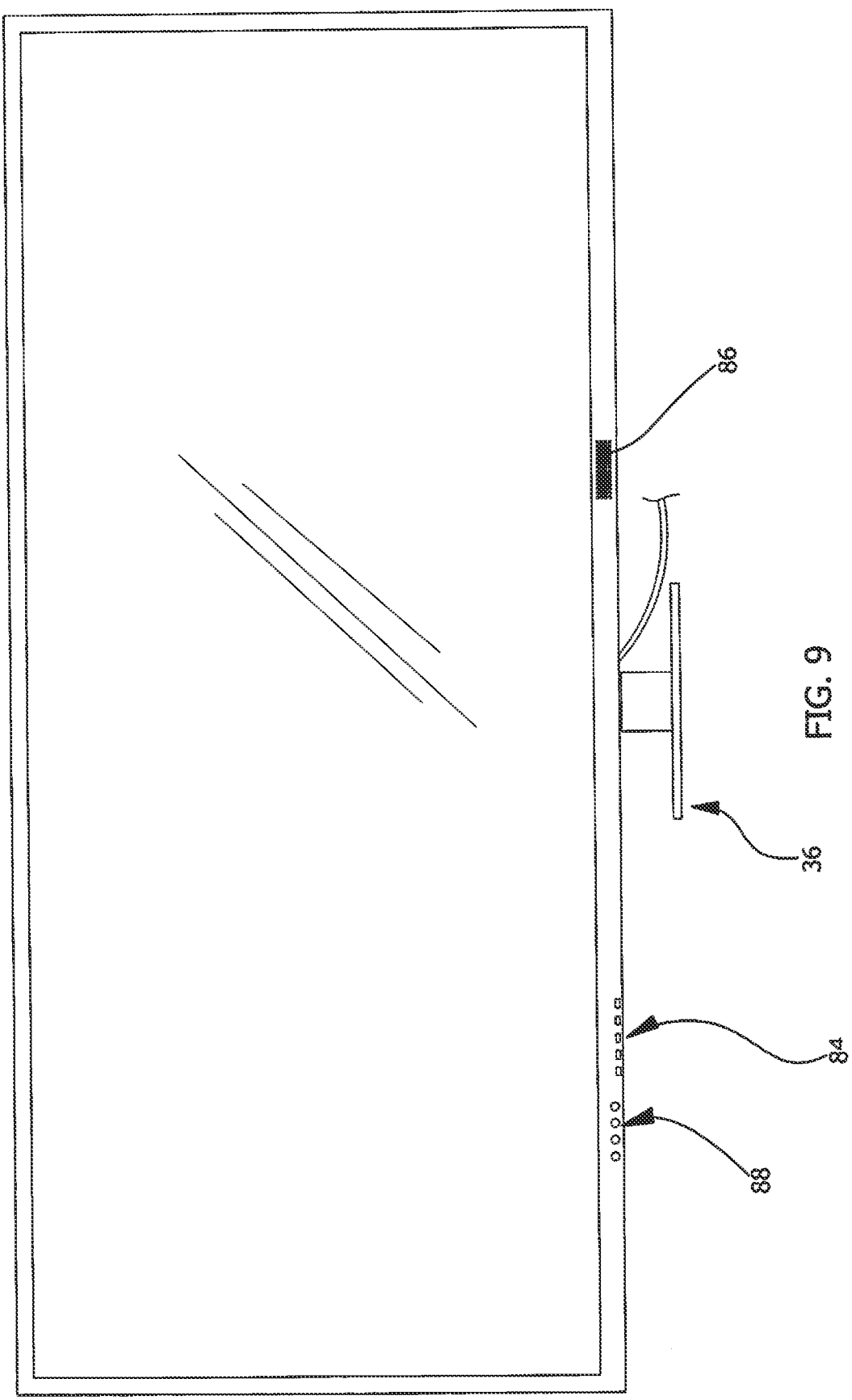
FIG. 9 is a front view of an embodiment of the disclosure.

In an alternative embodiment 100 as is most clearly shown in FIG. 9, each of the remote controls 95 may comprise a personal electronic device 102, including but not being limited to a smart phone, which has wireless communication capabilities for remotely controlling a respective signal unit 72. Furthermore, in the alternative embodiment 100, the second receiver 82 associated with each of the signal units 72 may comprise a radio frequency signal receiver or the like and the second receiver 82 associated with each of the signal units 72 may employ Bluetooth communication protocols. The alternative embodiment 100 further includes a plurality of wireless headphones 104 that can each be synchronized with the second receiver 82 associated with a respective one of the signal units 72 to facilitate the users 18 to hear audio associated with a respective first display 14 or second display 16.

In use, each of the remote controls 95 is employed by a respective one of the users 18 for controlling a respective first display 14 and second display 16. Furthermore, each of the signal units 72 can receive video signal and audio signal from any of the plurality of input ports 84 or the associated first receiver 78. In this way each of the users 18 can view video on the respective first display 14 and second display 16 from any conceivable signal source. Thus, one of the users 18 could watch streaming video from the internet and one of the users 18 could watch a movie from a digital video disk player, for example. Furthermore, each of the users 18 could simultaneously watch video from a common video source. In this way the users 18 have the freedom to watch different programing or the same programming, depending on the preference of the users 18.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A double sided monitor device for facilitating video from two different sources to be simultaneously displayed, said device comprising:
    a monitor having a first display and a second display, said first display and said second display being positioned on opposing sides of said monitor wherein each of said first display and said second display is configured to be visible to a respective one of a pair of users;
    a pedestal having said monitor being rotatably attached to said pedestal for rotating said monitor into a preferred orientation wherein said pedestal is configured to support said monitor over a support surface;
    a pair of signal units, each of said pair of signal units being integrated into said monitor, each of said pair of signal units being in electrical communication with a respective one of said first display and said second display, each of said signal units having a plurality of input elements wherein each of said signal units is configured to receive a signal from a variety of signal sources thereby facilitating each of said first display and said second display to display video from a respective signal source; and
    a pair of remote controls, each of said pair of remote controls being in remote communication with a respective one of said signal units for remotely controlling operational parameters of said respective signal unit wherein said pair of remote controls is configured to facilitate a pair of users to independently select the video to be displayed on a respective one of said first display and said second display;
    wherein said first display is integrated into a front surface of said monitor such that said first display covers a substantial area of said front surface;
    wherein said second display is integrated into a back surface of said monitor such that said second display covers a substantial area of said back surface;
    wherein said monitor has a stem extending downwardly from a bottom side of said monitor, said stem being centrally located along said bottom side, said stem having a distal end with respect to said bottom side;
    wherein said stem has a shaft well extending into said distal end, said shaft well being centrally located on said distal end; and
    wherein said stem has a depression extending into said distal end, said depression being continuous such that said depression forms a closed ring surrounding said shaft well, said depression having bounding surface being concavely arcuate with respect to said distal end.

2. The device according to claim 1, wherein said pedestal comprises:

a disk having a top surface and a perimeter edge, said disk being elongated such that said disk has an ovoid shape, said disk having a hole extending through said top surface and a bottom surface of said disk, said hole being centrally located on said disk;

a cup extending upwardly from said top surface of said disk, said cup being centrally positioned on said disk, said cup having a bottom wall and a perimeter wall extending upwardly from said bottom wall, said cup having a shaft aperture extending through said bottom wall, said shaft aperture being aligned with and intersecting said hole in said disk; and said cup receives said stem on said bottom side of said monitor such that said shaft aperture is aligned with said shaft well in said distal end of said stem, a top surface of said bottom wall of said cup having a depression extending downwardly into said top surface, said depression associated with said cup being continuous such that said depression associated with said cup forms a closed loop, said depression associated with said cup being aligned with said depression in said distal end of said stem.

3. The device according to claim 2, wherein said pedestal includes:

a ball bearing being positioned in said depression associated with said cup and said depression in said distal end of said stem thereby facilitating said stem to freely rotate in said cup;

a shaft extending through said hole in said disk and said shaft aperture in said cup, said shaft extending into said shaft well in said distal end of said stem;

said shaft having a lower head which is positioned in said hole in said disk, said hole having a diameter being less than a diameter of said shaft aperture thereby inhibiting said lower head from passing into said shaft aperture; and said shaft has an upper head which engages a bounding surface of said shaft well for retaining said stem in said cup.

4. The device according to claim 1, wherein each of said signal units comprises:

a processor being integrated into said monitor, said processor associated with each of said pair of signal units being electrically coupled to a respective one of said first display and said second display;

a first receiver being integrated into said monitor such that said first receiver defines a respective one of said plurality of input elements, said first receiver being electrically coupled to said processor, said first receiver being in wireless communication with an extrinsic communication network wherein said first receiver is configured to receive a broadcast signal from the extrinsic communication network thereby facilitating said respective first display or said second display to display video associated with the broadcast signal;

a plurality of input ports, each of said plurality of input ports being integrated into said monitor such that each of said plurality of input ports defines a respective one of said input elements, each of said plurality of input ports being electrically coupled to said processor, each of said plurality of input ports having a unique structure with each other wherein each of said plurality of input ports is configured to insertably receive a respective type of input cord for receiving a signal from the input cord thereby facilitating said respective first display or second display to display video associated with the signal;

a speaker being integrated into said monitor, said speaker being electrically coupled to said processor wherein said speaker is configured to emit audio associated with the signal received from said input ports or the broadcast signal received from said first receiver, said speaker associated with each of said pair of signal units being integrated into a respective one of said front surface of said monitor and said back surface of said monitor; and a plurality of control buttons, each of said plurality of control buttons being movably integrated into said monitor, each of said control buttons being electrically coupled to said processor for selecting operational parameters of said first receiver and said processor and said speaker.

5. A double sided monitor device for facilitating video from two different sources to be simultaneously displayed, said device comprising:

a monitor having a first display and a second display, said first display and said second display being positioned on opposing sides of said monitor wherein each of said first display and said second display is configured to be visible to a respective one of a pair of users;

a pedestal having said monitor being rotatably attached to said pedestal for rotating said monitor into a preferred orientation wherein said pedestal is configured to support said monitor over a support surface;

a pair of signal units, each of said pair of signal units being integrated into said monitor, each of said pair of signal units being in electrical communication with a respective one of said first display and said second display, each of said signal units having a plurality of input elements wherein each of said signal units is configured to receive a signal from a variety of signal sources thereby facilitating each of said first display and said second display to display video from a respective signal source; and a pair of remote controls, each of said pair of remote controls being in remote communication with a respective one of said signal units for remotely controlling operational parameters of said respective signal unit wherein said pair of remote controls is configured to facilitate a pair of users to independently select the video to be displayed on a respective one of said first display and said second display;

wherein each of said signal units comprises a processor being integrated into said monitor, said processor associated with each of said pair of signal units being electrically coupled to a respective one of said first display and said second display, a first receiver being integrated into said monitor such that said first receiver defines a respective one of said plurality of input elements, said first receiver being electrically coupled to said processor, said first receiver being in wireless communication with an extrinsic communication network wherein said first receiver is configured to receive a broadcast signal from the extrinsic communication network thereby facilitating said respective first display or said second display to display video associated with the broadcast signal, a plurality of input ports, each of said plurality of input ports being integrated into said monitor such that each of said plurality of input ports defines a respective one of said input elements, each of said plurality of input ports being electrically coupled to said processor, each of said plurality of input ports having a unique structure with each other wherein each of said plurality of input ports is configured to insertably receive a respective type of input cord for receiving a signal from the input cord thereby facilitating said respective first display or second display to display video associated with the signal, a speaker being integrated into said monitor, said speaker being electrically coupled to said processor wherein said speaker is configured to emit audio associated with the signal received from said input ports or the broadcast signal received from said first receiver, said speaker associated with each of said pair of signal units being integrated into a respective one of said front surface of said monitor and said back surface of said monitor, and a plurality of control buttons, each of said plurality of control buttons being movably integrated into said monitor, each of said control buttons being electrically coupled to said processor for selecting operational parameters of said first receiver and said processor and said speaker;

wherein each of said signal units includes a second receiver being integrated into said monitor, said second receiver being electrically coupled to said processor; and each of said pair of remote controls includes a transmitter being in wireless communication with said second receiver associated with said respective signal unit.

6. A double sided monitor device for facilitating video from two different sources to be simultaneously displayed, said device comprising:

a monitor having a first display and a second display, said first display and said second display being positioned on opposing sides of said monitor wherein each of said first display and said second display is configured to be visible to a respective one of a pair of users, said first display being integrated into a front surface of said monitor such that said first display covers a substantial area of said front surface, said second display being integrated into a back surface of said monitor such that said second display covers a substantial area of said back surface, said monitor having a stem extending downwardly from a bottom side of said monitor, said stem being centrally located along said bottom side, said stem having a distal end with respect to said bottom side, said stem having a shaft well extending into said distal end, said shaft well being centrally located on said distal end, said stem having a depression extending into said distal end, said depression being continuous such that said depression forms a closed ring surrounding said shaft well, said depression having bounding surface being concavely arcuate with respect to said distal end;

a pedestal having said monitor being rotatably attached to said pedestal for rotating said monitor into a preferred orientation wherein said pedestal is configured to support said monitor over a support surface, said pedestal comprising:

a disk having a top surface and a perimeter edge, said disk being elongated such that said disk has an ovoid shape, said disk having a hole extending through said top surface and a bottom surface of said disk, said hole being centrally located on said disk;

a cup extending upwardly from said top surface of said disk, said cup being centrally positioned on said disk, said cup having a bottom wall and a perimeter wall extending upwardly from said bottom wall, said cup having a shaft aperture extending through said bottom wall, said shaft aperture being aligned with and intersecting said hole in said disk, said cup receiving said stem on said bottom side of said monitor such that said shaft aperture is aligned with said shaft well in said distal end of said stem, a top surface of said bottom wall of said cup having a depression extending downwardly into said top surface, said depression associated with said cup being continuous such that said depression associated with said cup forms a closed loop, said depression associated with said cup being aligned with said depression in said distal end of said stem;

a ball bearing being positioned in said depression associated with said cup and said depression in said distal end of said stem thereby facilitating said stem to freely rotate in said cup; and a shaft extending through said hole in said disk and said shaft aperture in said cup, said shaft extending into said shaft well in said distal end of said stem, said shaft having a lower head which is positioned in said hole in said disk, said hole having a diameter being less than a diameter of said shaft aperture thereby inhibiting said lower head from passing into said shaft aperture, said shaft having an upper head which engages a bounding surface of said shaft well for retaining said stem in said cup;

a pair of signal units, each of said pair of signal units being integrated into said monitor, each of said pair of signal units being in electrical communication with a respective one of said first display and said second display, each of said signal units having a plurality of input elements wherein each of said signal units is configured to receive a signal from a variety of signal sources thereby facilitating each of said first display and said second display to display video from a respective signal source, each of said signal units comprising:

a processor being integrated into said monitor, said processor associated with each of said pair of signal units being electrically coupled to a respective one of said first display and said second display;

a first receiver being integrated into said monitor such that said first receiver defines a respective one of said plurality of input elements, said first receiver being electrically coupled to said processor, said first receiver being in wireless communication with an extrinsic communication network wherein said first receiver is configured to receive a broadcast signal from the extrinsic communication network thereby facilitating said respective first display or said second display to display video associated with the broadcast signal;

a second receiver being integrated into said monitor, said second receiver being electrically coupled to said processor;

a plurality of input ports, each of said plurality of input ports being integrated into said monitor such that each of said plurality of input ports defines a respective one of said input elements, each of said plurality of input ports being electrically coupled to said processor, each of said plurality of input ports having a unique structure with each other wherein each of said plurality of input ports is configured to insertably receive a respective type of input cord for receiving a signal from the input cord thereby facilitating said respective first display or second display to display video associated with the signal;

a speaker being integrated into said monitor, said speaker being electrically coupled to said processor wherein said speaker is configured to emit audio associated with the signal received from said input ports or the broadcast signal received from said first receiver, said speaker associated with each of said pair of signal units being integrated into a respective one of said front surface of said monitor and said back surface of said monitor; and a plurality of control buttons, each of said plurality of control buttons being movably integrated into said monitor, each of said control buttons being electrically coupled to said processor for selecting operational parameters of said first receiver and said processor and said speaker;

a power cord being coupled to and extending away from said monitor, said power cord being electrically coupled to said processor, said power cord having a male plug being electrically coupled to a distal end of said power cord thereby facilitating said male plug to be plugged into a power source comprising a female electrical outlet; and a pair of remote controls, each of said pair of remote controls being in remote communication with a respective one of said signal units for remotely controlling operational parameters of said respective signal unit wherein said pair of remote controls is configured to facilitate a pair of users to independently select the video to be displayed on a respective one of said first display and said second display, each of said pair of remote controls including a transmitter being in wireless communication with said second receiver associated with said respective signal unit.

* * * * *